United States Patent [19]

Brown

[11] 3,994,316
[45] Nov. 30, 1976

[54] PRESSURE CONTROL VALVE AND COUPLING

[75] Inventor: Albert W. Brown, Newport Beach, Calif.

[73] Assignee: International Telephone and Telegraph Corporation, New York, N.Y.

[22] Filed: July 3, 1975

[21] Appl. No.: 593,112

Related U.S. Application Data

[60] Division of Ser. No. 344,858, March 26, 1973, abandoned, which is a continuation-in-part of Ser. No. 291,894, Sept. 25, 1972, abandoned.

[52] U.S. Cl. ............................... 137/614; 137/489
[51] Int. Cl.² ........................................ F16L 29/00
[58] Field of Search ............... 137/488, 116.5, 281, 137/288, 614–614.06, 614.19, 137.1, 137.2, 489; 248/75, 76; 244/135

[56] References Cited
UNITED STATES PATENTS

| | | | |
|---|---|---|---|
| 2,649,109 | 8/1953 | Samiran | 137/614 X |
| 2,836,207 | 5/1958 | Griswold | 137/614 X |
| 2,943,636 | 7/1960 | Reed et al. | 137/614.03 X |
| 3,034,544 | 5/1962 | Griswold | 137/614.06 X |
| 3,125,319 | 3/1964 | Arbogast et al. | 137/489 X |
| 3,168,125 | 2/1965 | Rosell | 137/614.06 X |
| 3,251,379 | 5/1966 | Lebow | 137/614.01 X |
| 3,286,725 | 11/1966 | Elbogen et al. | 137/484.2 |
| 3,298,390 | 1/1967 | DeGraaf | 137/489 X |

*Primary Examiner*—Martin P. Schwadron
*Assistant Examiner*—H. Jay Spiegel
*Attorney, Agent, or Firm*—Thomas L. Peterson

[57] ABSTRACT

This disclosure relates to a hydrant coupling device including a pressure control valve which, due to its portability, may be connected to any one of a plurality of hydrants to regulate the flow of liquid therefrom, and additionally including a pit valve which is interlocked with the pressure control valve body to prevent the spilling of liquid if the control valve is accidentally forced loose from the pit valve.

4 Claims, 12 Drawing Figures

PRESSURE CONTROL VALVE AND COUPLING

RELATED APPLICATION

This application is a division of copending application Ser. No. 344,858, filed Mar. 26, 1973, and now abandoned, entitled Pressure Control Valve and Coupling, which is a continuation-in-part of copending application Ser. No. 291,894, filed Sept. 25, 1972, entitled Pressure Control Valve and Coupling, now abandoned.

BACKGROUND OF THE INVENTION

This invention relates to pressure control valves, and more particularly to a pressure control valve adaptable for use in a hydrant-type fueling system for aircraft or for any other fluid pressure system in which it is desired to automatically regulate the pressure of fluid supplied from one part of the system to another.

It has been common, particularly in aircraft fueling systems to include in the fluid pressure system, as at an airport, a plurality of stations at which fluid may be withdrawn, such stations located for example, at parking places where aircraft may be fueled. Each of these stations is typically connected by an underground piping system to a fluid supply tank and a pump which maintains fluid pressure in the entire system. Each of the fueling stations at an airport typically includes a hydrant and a pressure control valve bolted or otherwise semi-permanently affixed to the hydrant. A flexible hose may be coupled between the pressure control valve and the fuel tank of an aircraft. Such installations typically include the pressure control valve below the pavement surface in a pit which may be covered to prevent damage to the pressure control valve. Such installations require an individual pressure control valve for each such pit. However, since it is common to use only a portion of the fueling stations at any given time, the use of a pressure control valve permanently installed at each pit substantially increases the cost of such installations. In addition, removal of the pressure control valve for maintenance requires that the individual fueling station to which the valve is attached be shut down for a period of time while the pressure regulator valve is removed from the hydrant and repaired.

Pressure control is a particular problem in re-fueling large airplanes because of the tremendous quantities of fuel which must be supplied in a short period of time. For example, a large jet passenger plane might require 45,000 gallons of fuel to be supplied at flow rates up to 2000 gallons per minute at pressures up to 50 psig. The receiving tanks on the aircraft could be damaged by pressure beyond their design capability, so it is essential that the pressure be maintained accurately within a specified range in order to achieve the desired flow rate while avoiding any possible damage to the aircraft. Moreover, safeguards must be provided to immediately shut the flow off if the hose to the aircraft ruptures in order to prevent spilling large quantities of fuel on the ground. Such spillage at the high flow rates here involved would create a very dangerous condition.

SUMMARY OF THE INVENTION

The present invention alleviates many of the problems of such prior art installations by incorporating the pressure control valve in a portable unit which is coupled to the filling hose and may be moved from hydrant to hydrant. In a typical installation it is only necessary to include enough pressure control valves for peak use of the entire hydrant system, which is typically fewer valves than would be required if an individual valve was attached to each hydrant. In addition, since the pressure control valves are a part of the removable and portable portion of the fluid pressure system, they may be readily replaced by another pressure control valve for maintenance purposes, thus avoiding costly downtime of any one of the filling stations.

In practice it has been found that portable hose connections of an aircraft refueling system are subjected to severe abuse in handling by the crews. In order to make the pressure control valve of the present invention portable without sacrificing reliability it has been found advantageous to locate the sensitive control elements thereof within the main body of the pressure control valve where they are not readily subject to abuse during handling of the valve. In addition, it has been found necessary to develop an improved coupling device for attaching the pressure control valve to any one of the fuel hydrants. This coupling mechanism includes a pressure relief valve for relieving the fluid lock which would otherwise exist between the hydrant and the pressure control valve and would prohibit proper uncoupling of the pressure control valve from the hydrant.

In order to facilitate attachment of the pressure control valve to the hydrant, it has been found advantageous to place the pressure regulator valve above the surface of the surrounding pavement. However, this projection of the valve subjects it to damage from trucks and aircraft moving on the pavement surface. In order to assure that damage to the pressure control valve does not result in dangerous spilling of fuel from the hydrant an improved coupling is used to attach the pressure regulator valve to the hydrant. This coupling includes a mechanical fuse to assure that, if the pressure control valve is struck a sufficient blow to damage the valve or the hydrant, the coupling will release from the hydrant. In addition, a spring loaded flapper valve is installed in the hydrant and is mechanically interlocked to the coupling so that, if the pressure control valve is jarred from the hydrant, the flapper valve will automatically close to prevent fuel from being pumped onto the pavement. The flapper valve includes a pressure equalizing valve to facilitate opening of the flapper valve against hydrant pressure.

The coupling is additionally interlocked with a poppet valve which is used to close the inlet of the pressure control valve. This interlock prevents the coupling from being removed from the hydrant when the poppet valve is open to avoid accidental fuel spillage due to inadvertent disconnection of the pressure control valve from the hydrant. The interlock also prevents the poppet valve from being opened until the coupling is properly attached to the hydrant.

As an additional safety feature, the coupling remains sealed to the hydrant when the poppet valves are closed. Therefore, in the event of a faulty valve upstream from the coupler, the pressure exerted by the fluid against the pressure control valve prohibits uncoupling of the pressure control valve from the hydrant.

The pressure control valve also includes an excess flow control sensing mechanism which closes the valve if a predetermined rate of flow of fluid through the valve is exceeded. In the preferred embodiment, this excess flow control may be readily set to close the pressure regulator valve at either of two flow levels. This excess flow control is likewise interlocked to the improved coupling mechanism so that each time the pressure control valve is removed from a hydrant and replaced on a second hydrant, the excess flow control is automatically reset to close the pressure regulator valve at the lower of the two permissible flow rates. The excess flow control must then be manually reset after the pressure regulator valve is coupled to the hydrant if the higher excess flow control setting is desired. This improvement prohibits inadvertent setting of the excess flow control at the higher flow position.

The coupler of the present invention is spring loaded to enable convenient connection of the fluid pressure line to the hydrant, so that the connection may be made by one operator regardless of the orientation of the hydrant.

Other features of this invention will be apparent from the following description and from the drawings.

BRIEF DESCRIPTION OF THE DRAWINGS

In FIG. 2 the main piston of the pressure control valve is shown in a partially open position, the pressure control valve is fully coupled to the hydrant, and the excess flow control is in the low flow position.

In FIG. 4, the coupling mechanism is shown in the configuration of FIG. 1, that is, prior to coupling of the valve to the hydrant.

DETAILED DESCRIPTION OF THE PREFERRED EMBODIMENT

Figure 1:
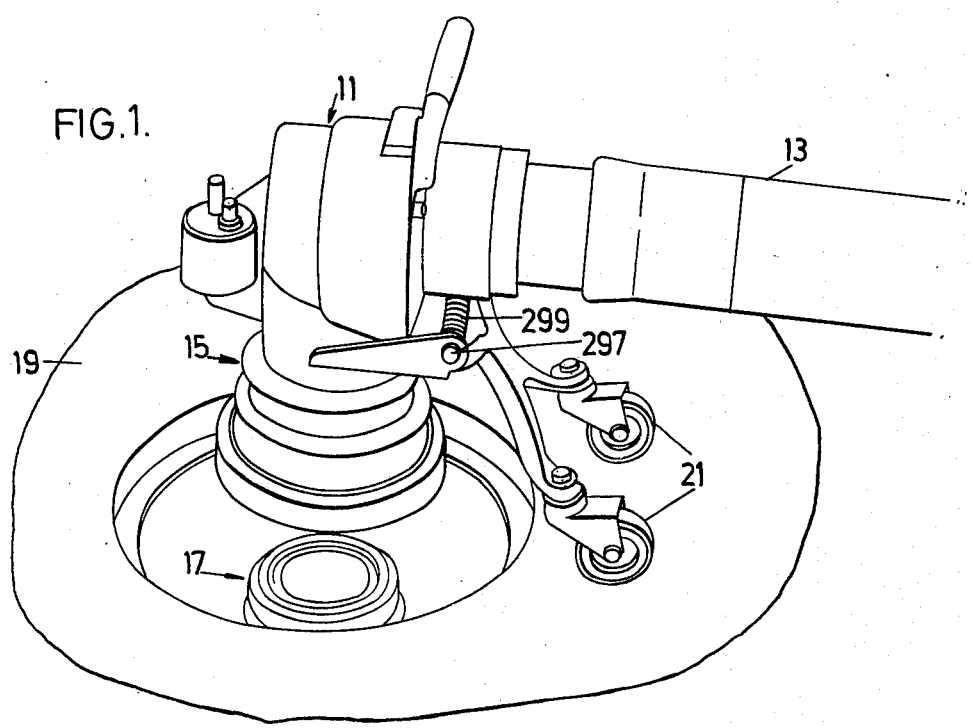
FIG. 1 is a perspective view of the pressure control valve positioned above a hydrant pit prior to coupling of the valve to the hydrant.

Referring initially to FIG. 1, the pressure control valve main housing 11 is shown connected to a flexible hose 13 which, in a typical installation, leads to an aircraft fuel tank (not shown) to be filled. The hose 13 is typically attached, at spaced intervals wheeled dollies (not shown) to facilitate transportation of the hose 13. The main housing 11 is rigidly connected, as by flanges, to a coupler 15 which is designed to engage an American Petroleum Institute type hydrant pit valve 17.

As shown in FIG. 1, the pit valve 17 is advantageously located below the surface of the surrounding pavement 19 so that it may be covered to protect it when not in use. The pressure control valve 11, however, typically extends above the pavement 19 when coupled to the pit valve 17, so that the hose 13 may lie along the surface of the pavement 19 during use. A pair of wheels 21 is mounted on the pressure control valve 11 to facilitate rolling the pressure control valve 11 and hose 13 to the pit valve 17.

Referring to FIGS. 2–9, the functional details of the pressure control valve 11, the coupler 15 and the pit valve 17 may be explained. The pressure control valve 11 includes a main flow passage, having an inlet 27 and an outlet 29, the orifice of which may be adjusted by a main piston 31 to regulate the flow of liquid through the valve 11. The main piston 31 includes a piston actuating chamber 33 which may be pressurized, as explained below, to adjust the position of the main piston 31. This chamber is sealed, as by an O-ring 35, to a cylindrical bore 37 which forms a portion of the housing of the pressure control valve 11. The chamber 33 is additionally sealed by an O-ring 39 to the outer cylindrical surface of a tubular member 41 which is attached to the housing of the valve 11. The piston 31 is therefore free to move axially along the tubular member 41 and the cylindrical bore 37, while the actuating chamber 33 remains sealed from the main flow passage. A main piston seal 43 (See FIG. 3) contacts a main piston seat 45 when the main piston 31 is at its closed position, thereby closing off the main flow passage. A spring 47 bears against a portion 48 of the piston and a portion 49 of the body of the valve 11 and biases the main piston 31 to a closed position.

Figure 3:
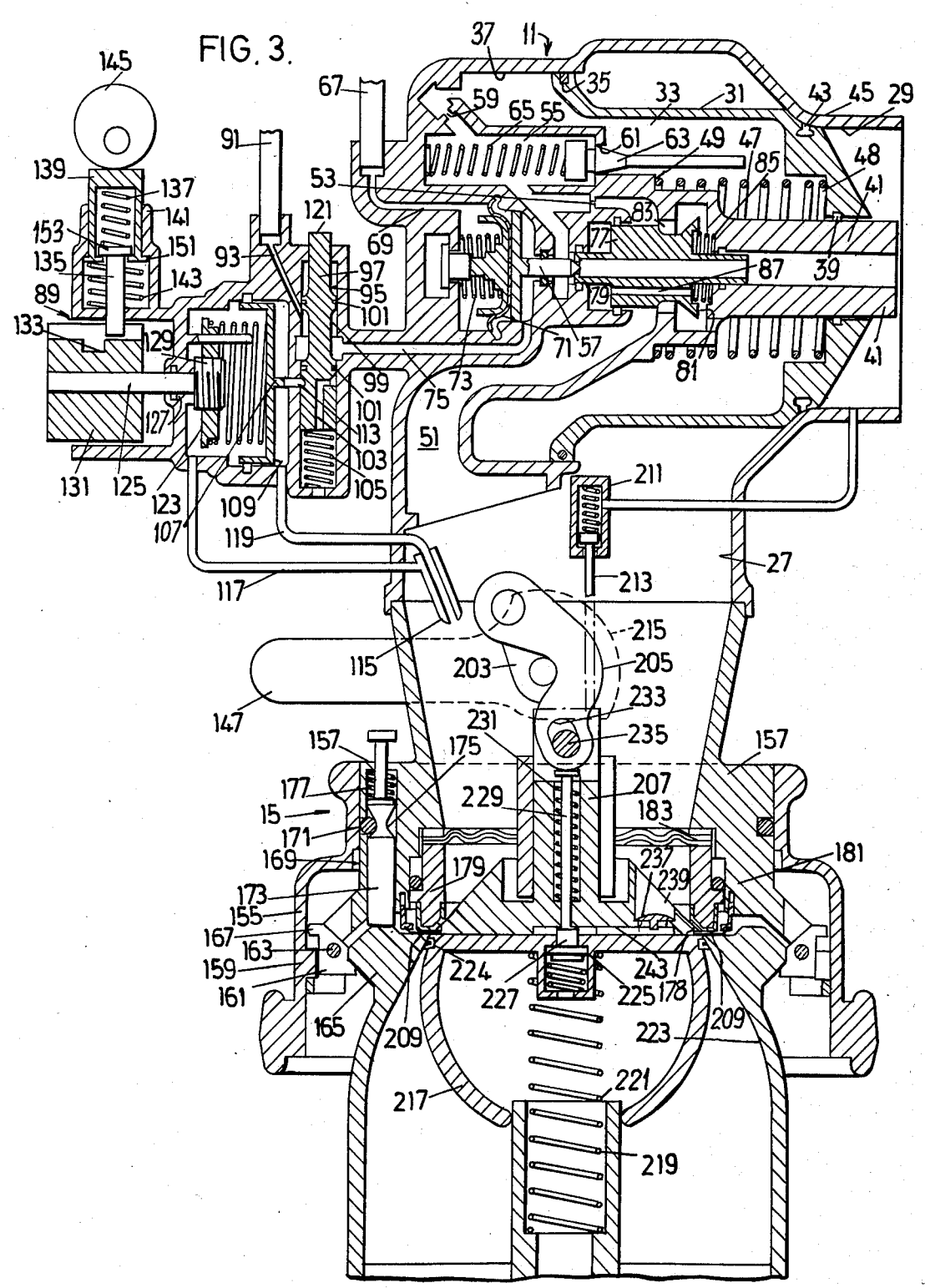
FIG. 3 is a schematic sectional view similar to FIG. 2 showing the configuration of the pressure control valve and hydrant subsequent to coupling these elements together, but prior to opening of either of the poppet valves or the main pressure control piston.

Operation of the pressure control valve is best described in reference to FIG. 3. Pressure within the chamber 33 is regulated in order to adjust the axial position of the main piston 31. High pressure fluid from the hydrant is admitted through a passage 51 to a pilot supply orifice 53 which controls the rate of fluid flow into a control passage 55. Fluid in this controlled passage 55 is allowed to flow to the main flow passage outlet 29 of the pressure control valve 11 through the tubular member 41 under the control of a pilot valve 57. The relative rate of fluid flow into the control passage 55 through the orifice 53 and out of the control passage 55 under the control of the pilot valve 57 regulates the pressure in the control passage 55. A piston damping orifice 59 allows fluid to flow between the control passage 55 and the actuating chamber 33 at a controlled rate. A change in pressure in the control passage 55 will therefore change the axial position of the main piston 31, but the rate at which the main piston 31 may be moved is controlled by the size of the orifice 59.

A second orifice 61 connects the control passage 55 to the actuating chamber 33. The size of this orifice 61 is controlled by a needle valve 63 which is biased to close the orifice 61 by a spring 65 which bears against the body of the valve 11. The position of the needle valve 63 is controlled by the main piston 31. When the main piston 31 is closed to a greater extent than that shown in FIG. 2, the needle valve 63 is closed and flow of fluid between the control passage 55 and the actuating chamber 33 is controlled by the orifice 59. When the main piston is opened to a greater extent than shown in FIG. 2, the main piston 31 contacts the stem of the needle valve 63 and raises the needle valve 63 from its seat, thereby partially opening the orifice 61. Since the size of the orifice connecting the control passage 55 to the piston actuating chamber 33 controls the rate at which changes in pressure in the control passage 55 can affect a change in the position of the main piston 31, the main piston 31 may be adjusted at a faster rate when the needle valve 63 is open. Since rapid fluctuation in the position of the main piston 31 when the main piston 31 is only slightly open would cause extreme pressure fluctuations at the outlet 29 of the valve 11, the orifice 59 is designed to limit the short term fluctuations at this position of the main piston 31. However, when the main piston 31 is opened to a significant extent, so that a large quantity of fluid is flowing through the pressure regulating valve 11, it is desirable to allow the main piston 31 to regulate the flow more rapidly. The needle valve 63 therefore adjusts the possible rate of flow between the control passage 55 and the piston actuating chamber 33 in accordance with the position of the main piston 31.

In order to maintain the pressure at the coupling (not shown) between the hose 13 and the aircraft tank at the proper level, a pressure sensing tube 67 is connected to the hose 13 at the extremity adjacent to the aircraft tank and this pressure is conducted through a passage 69 to one side of a pressure sensing diaphram 71 which is attached to the pilot valve 57. This diaphram 71 is biased toward a position which closes the pilot valve 57 by a spring 73.

Air under regulated pressure is supplied to the other side of the diaghram 71 through a passage 75. The pressure of the air in passage 75 is adjusted to maintain the proper pressure at the aircraft fuel tank. It will therefore be understood that when the air pressure in the passage 75 exceeds the pressure in the passage 69 and the force of the spring 73, indicating that the pressure at the fuel tank is too low, the diaphram 71 will move against the bias of the spring 73 to open the pilot valve 57, increasing the flow of fluid from the control passage 55 into the outlet 29 of the valve 11, thus reducing the pressure in the control passage 55. As this pressure is reduced, fuel will flow from the piston actuating chamber 33 through the orifice 59 (and the orifice 61 if valve 63 is open) into the control passage 55, thus allowing the main piston 31 to move away from its seat 39, thereby opening the valve 11 and increasing the downstream pressure. If, on the other hand, the pressure at the fuel tank and in the passage 69, along with the bias of the spring 73, exceeds the air pressure in the passage 75, indicating that the downstream pressure is too high, the diaphram 71 will move to close the pilot valve 57 so that the flow of fluid into the control passage 55 through the orifice 53 exceeds the flow through the pilot valve 57, increasing the pressure in the control passage 55 and, through the orifice 59 (and the orifice 61, if open) increasing the pressure in the actuating chamber 33 to move the main piston 31 toward its closed position, reducing the downstream pressure.

A high capacity pilot valve 77 is included in the pressure control valve 11 to bypass the control passage 55 to abruptly close the main piston 31 in the event that the pressure at the aircraft tank increases abruptly. This abrupt increase in pressure at the tank may occur, for example, when the tank is full and the valves within the tank close. The valve seat 79 of the pilot valve 57 is integral with the valve 77 which includes a sealing lip 81 which closes a port 83 between the high pressure passage 51 and the piston chamber 33. This valve 77, which is biased by a spring 85 to close the port 83, (See FIG. 3) is opened by motion of the pilot valve 57 after the pilot valve 57 has contacted its seat 79. The tension of the spring 73 is selected to exceed the tension of the spring 85 so that the high capacity pilot valve is open whenever air pressure is not applied to the passage 75. If the pressure at the tank, as monitored by the pressure sensing tube 67, exceeds the air pressure in the passage 75, the diaphram 71 will move the pilot valve 57 into contact with the seat 79 and will continue moving the pilot valve 57, the seat 79 and its associated high capacity valve 77 so that the port 83 allows flow of the high pressure hydrant fluid directly from the passage 55 into the piston actuating chamber 33 which will immediately close the main piston 31. Thus, any large increase in the downstream pressure or reduction in the air pressure will affect an immediate closing of the pressure control valve 11 to avoid damage or rupture to downstream houses and tanks. A passage 87 connects between the two faces of the high capacity pilot valve 77 to avoid a fluid lock behind the pilot valve 77 which would otherwise prohibit its motion. This passage 87 likewise equalizes the pressure on the opposite faces of the high capacity pilot valve 77 so that its operation is not affected by changes in hydrant pressure.

From the foregoing, it can be seen that the control components of the pressure control valve 11, that is, the pilot valve 57 with its associated diaphram 71, passages and orifices 55, 69, 75, 59, 61 and 53 are housed within the main body of the pressure control valve 11 to protect the elements from abuse during use and transporation of the pressure control valve 11. In addition, the entire pressure control valve 11 is constructed in the form of an elbow, with the outlet 29 being positioned at right angles to the inlet 27. This construction facilitates the connection and disconnection of the valve 11 from the hydrant 17 since the hose 13 may be laid flat along the pavement 19, and permits access to the control components for maintenance purposes.

Figure 2:
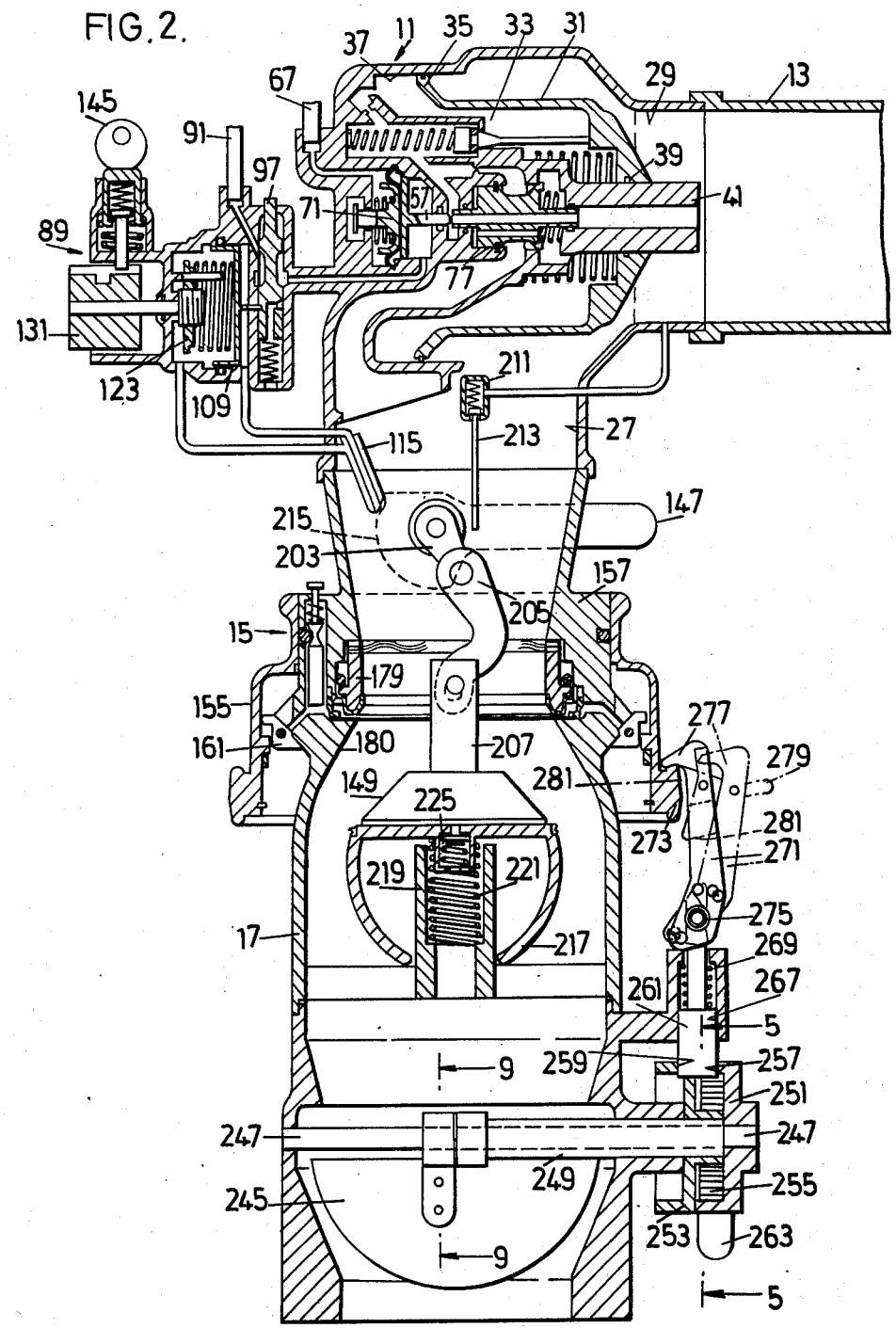
FIG. 2 is a schematic sectional view of the hydrant, pressure control valve, excess flow control and the coupler which is used to connect the pressure control valve to the hydrant. The excess flow control in FIG. 2 has been relocated from its normal attachment position on the pressure control valve to facilitate the description of its operation.

The pressure control valve 11 additionally incorporates an excess flow control 89, best shown in FIGS. 2 and 3, which operates to relieve the air pressure in the passage 75 in the event that the fluid flow rate through the valve 11 exceeds a predetermined maximum. As will be readily understood, if the hose 13 is ruptured or becomes disconnected from the fuel tank which is being filled, the downstream pressure will be greatly reduced. Since a downstream pressure reduction will cause the main piston 31 to open to an even greater extent, a great quantity of fuel may be spilled on the pavement. The excess flow control 89 is used to connect the source of regulated air pressure, which is connected to a conduit 91 to the passage 61. The conduit 91 leads to a passage 93 which opens into a bore 95 in the body of the excess flow controller 89. A valve 97 is axially moveable within the bore 95 and includes a reduced diameter portion 99 between a pair of O-rings 101 which seal the valve 97 within the bore 95. With the valve 97 at the lower extreme of its axial movement, as shown in FIG. 3, the reduced diameter portion 99 connects the passage 93 to the passage 75 and allows the regulated air pressure to pass from the conduit 91 into the passage 75 to control the position of the pilot valve 57. When the valve 81 is at the upper extreme of its axial travel, the passage 93 is blocked, and the passage 75 is vented through a passage 103 within the valve 97 to the atmosphere. Therefore, with the valve 97 at this latter extremity in its axial travel, the air pressure within the passage 75 is exhausted and the diaphram 71 under the bias of the spring 73 will operate to close the pilot valve 57 and to open the high capacity pilot valve 77, causing the main piston 31 to close. The valve 97 is biased by a spring 105 to this latter position wherein the pressure within the passage 75 is exhausted, but is maintained at the other extremity to allow pressurized air to flow from the passage 93 to the passage 75 by the interference of a pin 107 which is connected to a piston 109. This piston 109 is biased by a spring 111 to a position which maintains the pin 107 against the valve 97. A reduced diameter portion 113 in the valve 97 accepts the pin 107 to hold the valve 97 in its normal operating position.

A pitot-static tube 115 monitors the dynamic and static pressure within the pressure regulating valve 11, and, through a pair of conduits 117 and 119, controls the position of the piston 109. The conduit 117 connects the static pressure portion of the pitot-static tube 115 to one side of the piston 109, while the conduit 119 connects the dynamic pressure portion of the pitot-static tube 115 to the other face of the piston 109. So long as the dynamic pressure does not exceed the static pressure by a predetermined amount, the spring 111 will maintain the piston 109 at the extremity shown in FIG. 3, with the pin 107 positioned within the reduced diameter portion 113 of the valve 97. If, however, the flow within the valve 11 becomes excessive, the dynamic pressure will exceed the static pressure by an amount sufficient to overcome the tension of the spring 111 and the piston 109 will move the pin 107 out of engagement with the valve 97. The spring 105 will then drive the valve 97 to its other extremity, exhausting the passage 75 and closing the main valve 31.

In order to re-initiate fluid flow through the valve 11, the end 121 of the valve 97 must be depressed by the operator to align the pin 107 with the reduced diameter portion 113, cocking the valve 97. The rate of flow at which the dynamic pressure exceeds the static pressure by an amount sufficient to move the piston 109 is determined by the tension in the spring 111. This tension is determined by the position of a flange 123 which secures the other extremity of the spring 111. This flange 123 is supported by a rod 125 which is axially moveable within a bore 127 in the excess flow control 89. Due to the tension of the spring 111, the flange 123 and rod 125 will normally be maintained at a first position with an enlarged diameter portion 129 of the rod 125 abutted against the bore 127. If, however, a button 131, connected to the rod 125, is depressed by the operator, the rod 125 and the flange 123 may be moved to increase the tension in the spring 111. The button 131 includes an aperture 133 which will accept a pin 135.

The pin 135 is biased by a spring 137 toward the aperture 133. If, therefore, the operator depresses the button 131, the pin 135 will engage the aperture 133, and the tension in the spring 111 will be increased to require a greater differential between the static and dynamic pressure monitored by the pitot-static tube 115 for movement of the pin 107 out of engagement with the valve 97. With the button 131 so depressed, the pressure control valve 11 is in a high flow configuration allowing a higher flow rate before the valve 97 moves to cause a closing of the main piston 31.

The spring 137 is maintained within a cup shaped member 139 which is axially moveable within a sleeve 141 and biased by a spring 143 against a cam 145. The spring 143 is selected to have a tension which exceeds that of the spring 137. This cam 145 is included on a main lever 147 which is used to open a poppet valve 149 of the pressure control valve 11. Since the entire excess flow control 89 has been positioned in the figures for ease of illustration, rather than in its actual position, the cam 145 is shown separated from the main lever 147. When the main lever 147 is turned to a position, as shown in FIG. 3, which closes the poppet valve 149, the cam 145 is turned to allow the cup shaped member 139 to move axially away from the button 131. An annular flange 151 on the member 139 engages an enlarged diameter portion 153 of the pin 135 when the cam 145 is turned to the position shown in FIG. 3. This engagement of the annular flange 151 with the pin 135 withdraws the pin 135 from the aperture 133 allowing the button 131 to move axially due to the bias of the spring 111 to the low flow position. However, when the handle 147 is turned to open the poppet valve 149, as shown in FIG. 2, the annular flange 151 becomes disengaged from the enlarged diameter portion 153 of the pin 135, and the pin 135 is biased against the face of the button 131 by the spring 137. In this position of the cam 145, if the button 131 is depressed by the operator, the pin 135 will engage in the aperture 133 and maintain the excess flow control 89 in the high flow position. The action of the cam 145 therefore provides a safety feature which automatically withdraws the pin 135 from the aperture 133 and allows the excess flow control 89 to return to the low flow position every time the pressure regulator valve 11 is disconnected from one hydrant and connected to another, since this operation requires rotation of the main lever 147.

The pressure control valve 11 is connected to the hydrant pit valve 17 by means of a coupler 15, best shown in FIGS. 3, 4, 7 and 8, which is rigidly attached to the valve 11. The coupler 15 includes a collar 155 which is axially slideable along an enlarged diameter portion 157 at the lower extremity of the coupler 15. An annular flange 159 of the collar 155 engages a series of lugs 161, each of which is pivotally connected by a pin 163 to the enlarged diameter portion 157 of the coupler 15. These lugs 161 are designed to latch the coupler 15 to a standard API hydrant pit valve flange 165 and are held in latching position by the annular flange 159, as shown in FIG. 3. The lugs 161 include a protrusion 167 which is engaged by the annular flange 159 when the collar 155 is raised to the position shown in FIG. 4 to rotate the lugs 161 about the pins 163 to release the coupler 15 from the flange 165. The lugs 161 are preferably constructed of a proper size and material so that they will rupture if the pressure control valve 11 is torn from the pit valve 17. This intentional mechanical failure of the lugs 161 operates as a mechanical fuse to protect the pit valve 17 from the damage which might be caused, for example, by the wheel of a truck or aircraft hitting the pressure control valve 11.

Figure 4:
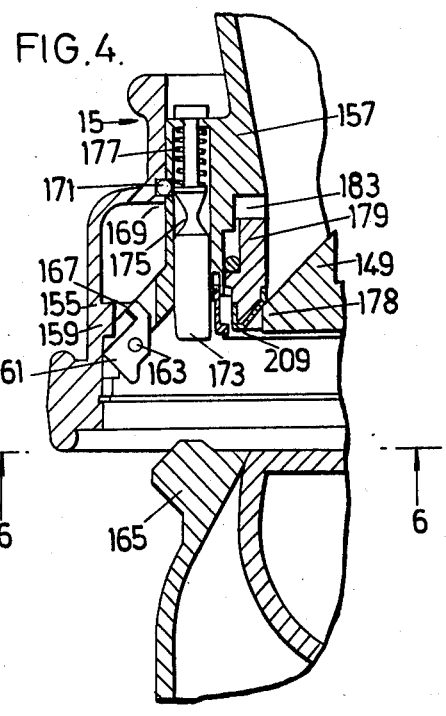
FIG. 4 is an enlarged schematic sectional view of a portion of the coupling mechanism and hydrant shown in FIGS. 2 and 3.

The collar 155 includes an increased diameter shoulder 169. This shoulder 169, as shown in FIG. 4, receives a locking ring 171 when the collar 155 is raised to a position which disengages the lugs 161 from the flange 165. The locking ring 171 is maintained in an annular groove in the enlarged diameter portion 157 of the coupler 15. A pin 173 having a reduced diameter camming portion 175 is mounted for axial movement within the enlarged diameter portion 157 of the coupler 15 and is biased to extend below the face of the enlarged diameter portion 157 by a spring 177. When the coupler 15 is detached from the pit valve 17, the spring 177 moves the pin 173 to a position shown in FIG. 4 which maintains the locking ring 171 above the reduced diameter camming portion 175 so that the locking ring 171 engages the shoulder 169 holding the collar 155 in its raised position, and thereby holds the lugs 161 in their retracted position. This facilitates placement of the collar 155 and the lugs 161 over the flange 165. When the coupler 15 is in position on the pit valve 17, the pin 173 contacts the flange 165 raising the pin 173, as shown in FIG. 3, so that the reduced diameter camming portion 175 is adjacent the locking ring 171, allowing the locking ring 171 to spring inwardly away from the shoulder 169 so that the collar 155 may be pressed downward to engage the lugs 161 onto the flange 165 as shown in FIG. 3.

Prior to latching of the coupler 15 to the pit valve 17, the poppet valve 149 of the coupler 15 will be in its sealed position, as shown in FIG. 4, bearing against a first sealing surface 178 of a coupler sealing ring 179 to prevent fluid from leaking from the coupler 15. The coupler sealing ring 179 is axially moveable within a bore 181 in the enlarged diameter portion 157 of the coupler 15, and is biased by a spring 183 so that when the poppet valve 149 is in its closed configuration the poppet valve 149 forces the coupler sealing ring 179 slightly into the body of the coupler 15 to provide a spring-biased seal with the poppet valve 149. With the collar 155 firmly latching the lugs 161 about the flange 165, the coupler sealing ring 179 is slightly spaced above the flange 165, as shown in FIG. 3.

Figure 6:
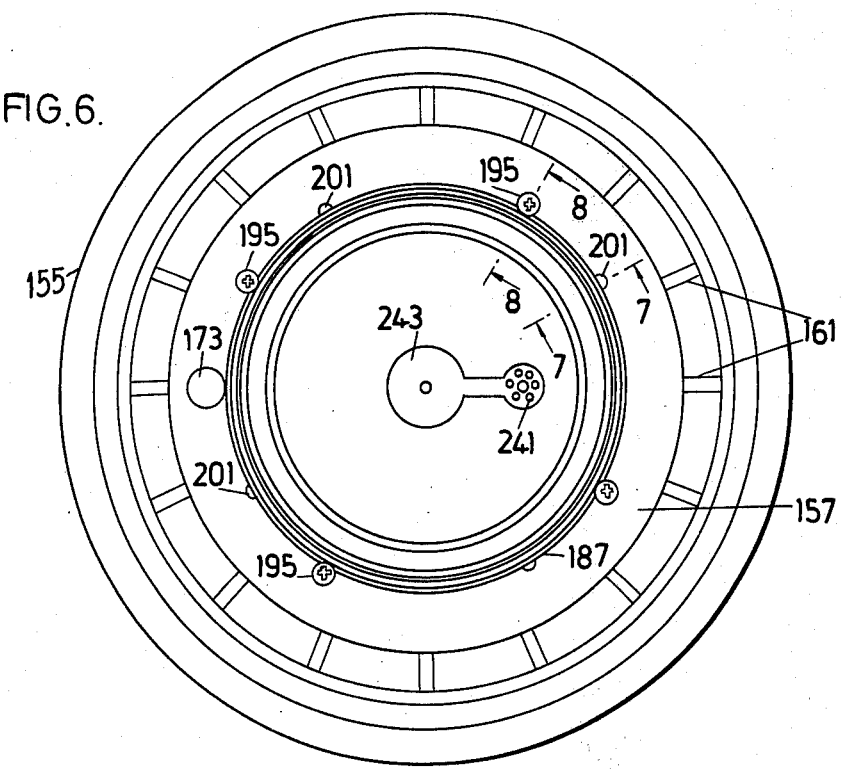
FIG. 6 is a schematic sectional view taken along line 6—6 of FIG. 5.
Figure 7:
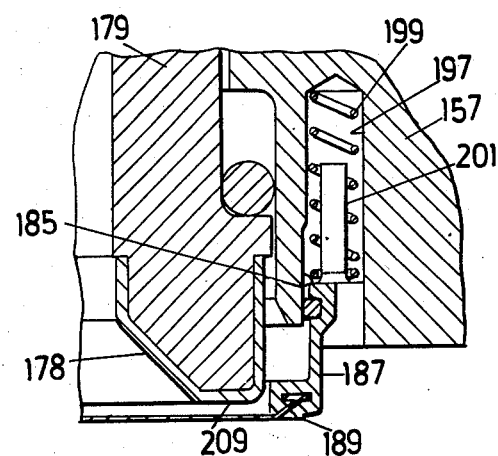
FIG. 7 is a schematic sectional view taken along line 7—7 of FIG. 6.
Figure 8:
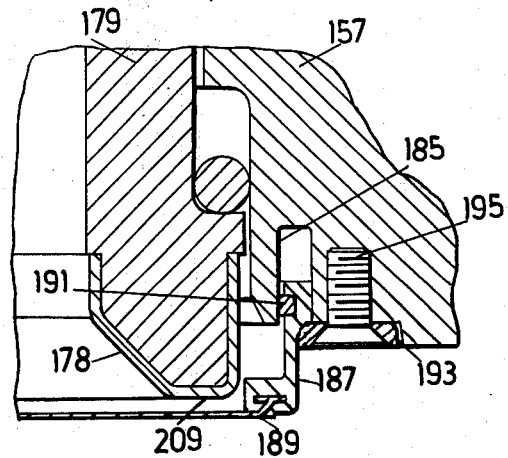
FIG. 8 is a schematic sectional view taken along line 8—8 of FIG. 6.

The enlarged diameter portion 157 of the coupler 15 includes an annular groove 185 which receives a secondary sealing ring 187 best shown in FIGS. 6, 7 and 8. This secondary sealing ring 187 includes a sealing member 189 which is designed to engage and seal against the flange 165. The secondary sealing ring 187 is sealed within the groove 185 by an O-ring 191 and is held within the groove 185 by a ring 193 which is permanently attached to the enlarged diameter portion 157 by a series of bolts 195. In addition the enlarged diameter portion 157 includes a plurality of bores 197, best shown in FIG. 7, each of which includes a spring 199 and a spring pin 201. The spring pin 201 engages the secondary sealing ring 187 and under the bias of the spring 199 forces the secondary sealing ring 187 to extend beyond both the enlarged diameter portion 157 and the sealing ring 179. It will be seen therefore that the sealing ring 179 and the secondary sealing ring 187 are independently mounted within the enlarged diameter portion 157 of the coupler 15 and each of these sealing rings 179 and 187 are biased for extension below the enlarged diameter portion 157. The maximum extension of the secondary sealing ring 187 is limited by the ring 193.

The secondary sealing ring 187 extends beyond the enlarged diameter portion 157 to a sufficient extent to allow the sealing member 189 to contact and seal against the flange 165, as shown in FIG. 3, when the coupler 15 and the pit valve 17 are initially coupled. Thus before the poppet valve 149 of the coupler 15 is opened, the coupler 15 is sealed to the flange 165 by the secondary sealing ring 187.

Once the coupler 15 and pit valve 17 are coupled, the poppet valve 149 of the coupler 15 may be opened by rotating the handle 147. This handle 147, as shown in FIGS. 2 and 3, includes a lever 203 which is pinned to a link 205 which is likewise pinned to an arm 207 attached to the poppet valve 149. When the handle 147 is rotated, the poppet valve 149 and the sealing ring 179 will be lowered together in sealed relationship until a second sealing surface 209 of the sealing ring 179 contacts and seals against the flange 165. Likewise, when the poppet valve 149 is being closed, prior to disconnection of the coupler 15 from the pit valve 17, the poppet valve 149 will raise the sealing ring 179 a short distance into the enlarged diameter portion 157, lifting the sealing surface 209 from the flange 165. This movement of the poppet valve 149 into the enlarged diameter portion 157 would be extremely difficult if the pressure control valve 11 and control coupler 15 were full of fluid, since the main piston 31 of the pressure control valve 11 would be closed during this movement and a fluid lock would exist between the main piston 31 and the seal of the poppet valve 149 against the sealing ring 179. A relief valve 211 is therefore included in the pressure regulating valve 11 to bypass fluid through a small opening around the main valve 31. This pressure relief valve 211 includes a valve stem 213 which contacts the upper extremity of the arm 207 of the poppet valve 149 when the poppet valve 149 is near its closed position. The length of the valve stem 213 is selected so that, as soon as the poppet valve 149 contacts the sealing surface 209, the pressure relief valve 211 will open.

In addition to the cam 145, a second cam 215 is included on the handle 147. This cam 215 bears against the top of the collar 155 when the handle 147 is rotated to the position shown in FIG. 2, so that the collar 155 may not be raised to release the control coupler 15 from the pit valve 17 until the handle 147 is rotated to close the poppet valve 149. This prevents inadvertent spilling of fuel. In addition, the cam 215 prevents turning of the handle 147 to open the poppet valve 149 unless the collar 155 is fully depressed so that the poppet valve 149 may not be opened until the coupler 15 is properly connected to the pit valve 17.

The pit valve 17 includes a second poppet valve 217 which is axially moveable along a sleeve 219 and is biased by a spring 221 to close against the mouth 223 of the hydrant 137. A sealing member 225 is incorporated in the poppet valve 217 to seal against the mouth 223.

Face to face contact of the poppet valves 149 and 217 allows opening of the poppet valve 217 against the bias of the spring 221 through rotation of the handle 147. It will be recognized that a fluid pressure exists within the pit valve 17, it will be extremely difficult to lower the poppet valve 217, without first pressurizing the inlet 27 of the pressure control valve 11 and the coupler valve 15. A pressure equalizing valve 225 is incorporated in the upper face of the poppet valve 217 and includes a valve stem 227 which protrudes slightly beyond the face of the poppet valve 217. An actuating pin 229 is mounted for axial movement within the poppet valve 149 and is biased to a raised position by a spring 231. The upper extremity of this pin 229 is in contact with the lower extremity of the link 205. The link 205 includes a slot 233 which allows a limited degree of free movement between the link 205 and a pin 235 which is used to connect the link 205 to the poppet valve 149. It will therefore be seen that initial rotation of the lever 147 will displace the link 205 relative the poppet valve 149 so that the pin 235 moves to the upper end of the slot 223. This motion allows the link 205 to depress the pin 229 and thereby open the pressure equalizing valve 225 prior to any movement of the poppet valve 149.

When the coupler 15 is initially placed on the pit valve 17 and the collar 155 is depressed to lock the coupler 15 to the pit valve 17 the secondary sealing ring 178 under the bias of springs 199 will seal against the flange 165. The coupler 15 and the pit valve 17 are therefore fluidly sealed so that it is now possible to pressurize the coupler 15 and inlet 27 of the pressure control valve 11. A one way flap valve 237 is included within a recess 239 in the poppet valve 149, as shown in FIG. 3. This flap valve 237 is positioned above a series of ports 241 which connect the recess 239 to the lower face of the poppet valve 149, as shown in FIG. 6. A recess 243 as shown in FIGS. 3 and 6 fluidly connects the flap valve 237 with the pressure equalizing valve 235. It will therefore be seen that when the pressure relief valve 225 has been opened by action of the pin 229 fluid will flow from the pit valve 17 through the pressure equalizing valve 225, recess 243 and flap valve 237 to pressurize the coupler 15 and the inlet 27 of the pressure control valve 11. It should be noted that prior to downward motion of the poppet valve 149 the sealing surface 209 is still spaced above the flange 165 so that any leakage of fluid between the faces of the poppet valves 149 and 217 would leak from the valve were it not for the sealing of the secondary sealing ring 187.

After the handle 147 has completed its initial movement which is permitted by the slot 233 in the link 205, continued rotation of the lever 147 causes the poppet valve 149 to continue lowering and to contact the poppet valve 217 thereby forcing the poppet valve 217 open. Since the pressure above and below the poppet valves 149 and 217 is equal this lowering motion is readily accomplished.

When the pressure control valve 11 is to be removed from the pit valve 17, the poppet valves 149 and 197 are closed by rotation of the handle 147, as explained above. Until the collar 155 of the coupler 15 is raised, the secondary sealing ring 187 maintains the seal between the control valve 11 and the pit valve 17. With the poppet valve 197 closed, and the handle 147 rotated to the uncoupling position, the pressure relief valve 191 will reduce the pressure in the inlet 27 of the control valve 11. If, however, the poppet valve 197 is faulty, so that fuel continues to flow, the control valve 11 remains pressurized, with the secondary sealing ring 187 preventing spillage. If, with such a fault occurring, the operator attempts to raise the collar 155 of the coupler 15, the pressure forcing the control valve 11 away from the pit valve 17 will prevent the lugs 161 from rotating, and will thus prohibit raising of the collar 155 until the fault is remedied.

Figure 5:
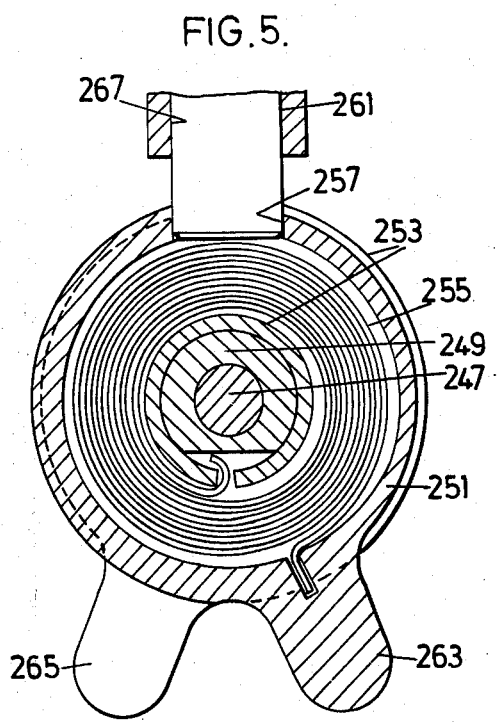
FIG. 5 is a schematic sectional view taken along line 5—5 of FIG. 2.

The pit valve 137 additionally incorporates a pair of flapper valves 245, one of which is shown in FIG. 2, which are rotatably mounted on a pair of concentric shafts 247 and 249. These shafts 247 and 249 are connected to a pair of flanges 251 and 253, respectively, which rotate with the shafts 247 and 249. A spring 225, best shown in FIG. 5, is attached to each of the flanges 251 and 253 to bias the flapper valves 245 to a closed position. The flanges 251 and 253 each include an aperture 257 and 259, respectively which is aligned with a pin 261 when the flapper valves 245 are adjusted to their open position, as by manipulating the tabs 263 and 265. The pin 261 is axially moveable within a sleeve 267 so that it may engage and disengage the apertures 257 and 259 within the flanges 251 and 253. The pin 261 is biased toward the flanges 251 and 253 by a spring 269 so that, once the pin 261 is engaged within the apertures 257 and 259, the spring 269 will maintain the engagement. A link 271, shown in FIG. 2, is used to attach the pin 261 to a lip 273 surrounding the collar 155 of the coupler 15. The link 271 is pinned to the pin 261 and is biased to rotate toward the collar 155 by a spring 275. The link 271 includes a hook 277 which engages the lip 273 so that, if the pressure control valve 11 is torn from the pit valve 17 through an accident causing a failure of the lugs 161, the movement of the coupler 15 and the collar 155 away from the pit valve 17 will raise the link 271 to disengage the pin 261 from the apertures 257 and 259, automtically closing the flapper valves 245 under the action of the spring 255. The link 271 includes a rotatable camming lever 279 which, when rotated (as shown in phantom lines in FIG. 2) rotates the link 271 away from the lip 273 so that, during proper removal of the control coupler 15 from the pit valve 17, the locking ring lip 273 will slide along a flat face 281, of the rotatable lever 279 and avoid engagement of the link 271 with the lip 273. When the control coupler 15 is placed onto the pit valve 17, the upper surface of the hook 277 acts as a cam to rotate the link 271 to allow the lip 273 to pass beneath the hook 277.

Figure 9:
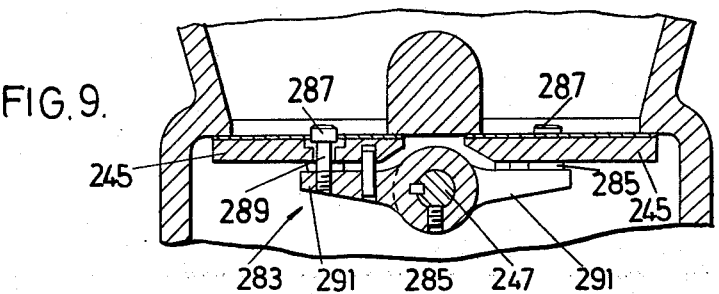
FIG. 9 is a schematic sectional view, taken along line 9—9 of FIG. 2, but with the flapper valve in a closed position.

It will be recognized that once the flapper valves 245 have closed, whether due to mechanical failure of the coupler 15 or for any other reason, it will be extremely difficult to reopen the flapper valves 245 so long as there is hydrant pressure below the valve. For this reason a pressure equalizing valve has been included in one of the flapper valves 245 as best shown in FIG. 9. This pressure regulating valve allows pressurization of the housing above the flapper valves 245 which in most circumstances will include only the pit valve housing 17 since the poppet valve 217 will be closed. The pressure equalizing valve 283 includes a sealing member such as an O-ring 285 positioned around a bolt 287 which passes through a bore 289 in the flapper valve 245. The bolt 287 is asserted into an actuating arm 291 which is connected to the shaft 247. It will be recognized that when the shaft 247 is rotated to close the flapper valve 245 the sealing ring 285 will be compressed between the actuating arm 291 and the flapper valve 245 to seal the bore 289. However, when it is desired to open the flapper valve 245, the shaft 247 is rotated so that the actuating arm 291 and its associated bolt 287 are lowered from the flapper valve 245, thus engaging the seal 285 from the bore 289 and allowing fluid to pass between the bolt 287 and the bore 289 to pressurize the housing above the flapper valves 245. Continued rotation of the shaft 247 will then open the flapper valve 245. A similar equalizing valve may be associated with each of the fiber valves 245 to allow pressure equalization when either of the actuating arms 291 is rotated.

Figure 10:
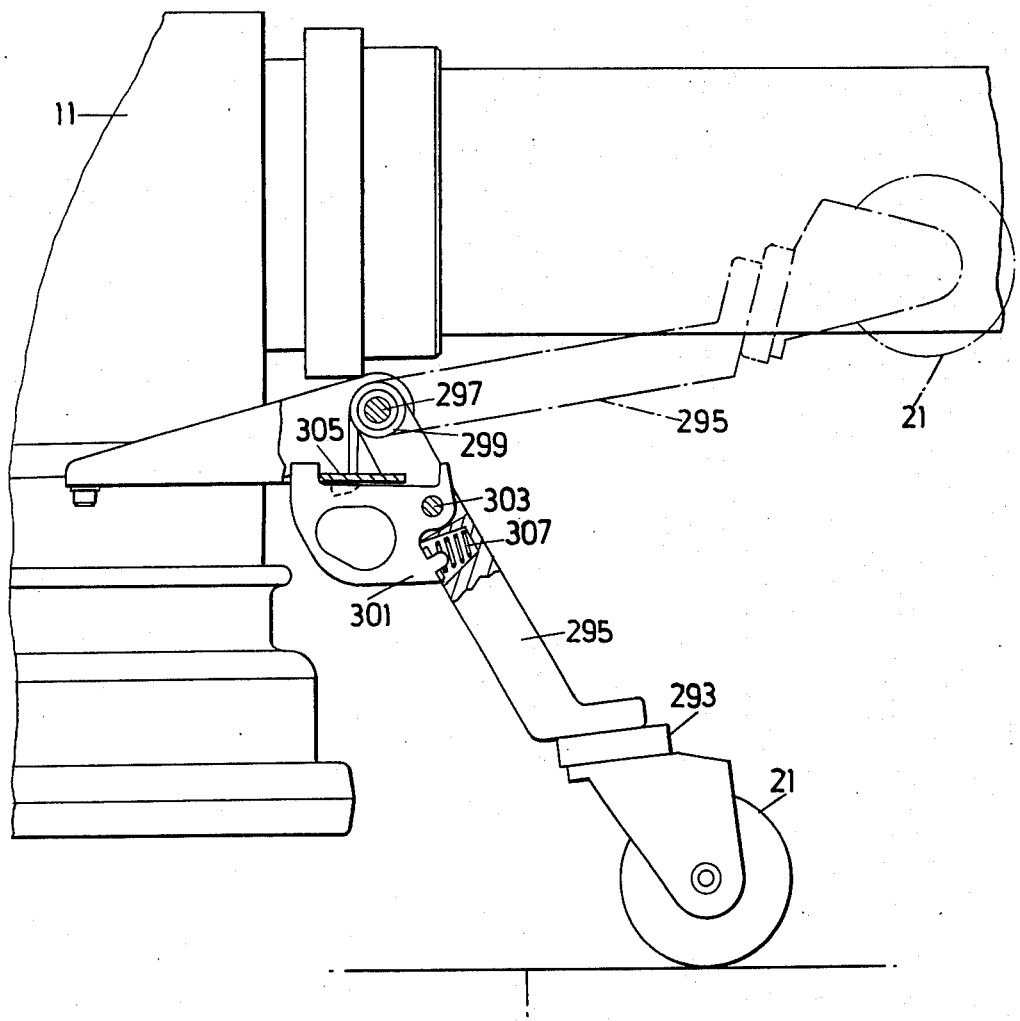
FIG. 10 is an elevation view, partially cut away, showing the wheel assembly used to transport the pressure control valve.

Referring now to FIG. 10 the details of the wheel assembly used for transporting the pressure control valve may be explained. The wheels 21 are mounted on casters 293 carried by legs 295 which rotate about a pin 297 which is attached to the housing of the pressure control valve 11. A spring 299 is used to bias the legs 295 to a retracted position as shown in phantom lines in FIG. 10. The wheels may be rotated by the operator to the operating position shown in full lines in FIG. 10 at which point a catch 301 which is pivotally mounted on a pin 303 attached to the leg 295 will engage a bracket 305 attached to the pressure control valve 11. This catch 301 is biased by a spring 307 to maintain the engagement of the catch 301 with the bracket 305 and thus hold the legs 295 in the position shown in full lines. The pressure control valve may now be wheeled to a position adjacent the pit valve 17. The operator may then depress the catch 301 allowing the legs 295 to rotate to the position shown in phantom lines under the action of the spring 299 thus allowing the operator to lower the pressure control valve 11 onto the pit valve 17.

It should be noted that in some circumstances it is advantageous to delete the catch 301 from the wheel assembly and to reverse the spring 299 so that the spring 299 biases the legs 295 to the position shown in full lines in FIG. 10. The wheels 21 under the action of the spring 299 will then partially support the weight of the pressure control valve 11 and facilitate rolling of the pressure control valve 11 to a position above the pit valve 17. The operator in this configuration needs only to depress the pressure control valve 11 onto the pit valve 17 against the bias of the spring 299 so that the wheels 21 will ride on the pavement 19 surrounding the pit valve 17 and will be raised to approximately the position shown in phantom lines in FIG. 10. This latter arrangement of the spring 299 will additionally assist the operator in removing the pressure control 11 from the pit valve 17 since the bias of the spring 299 will assist in lifting the pressure control valve 11 out of the pit.

Figure 11:
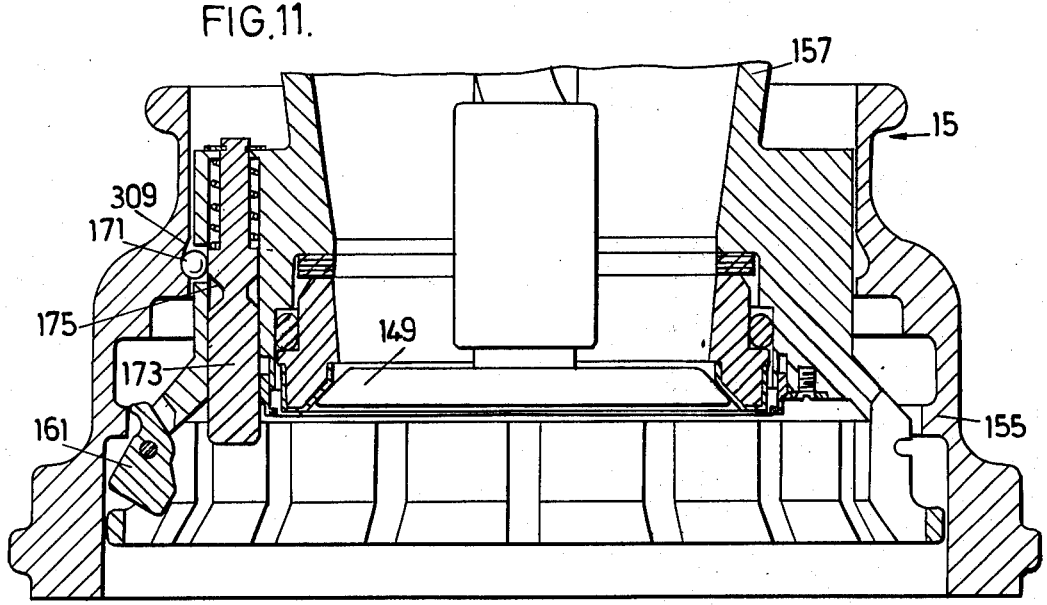
FIG. 11 is a partial schematic view, partially in section, similar to FIGS. 2 and 3, showing an improved spring-biased coupling mechanism.
Figure 12:
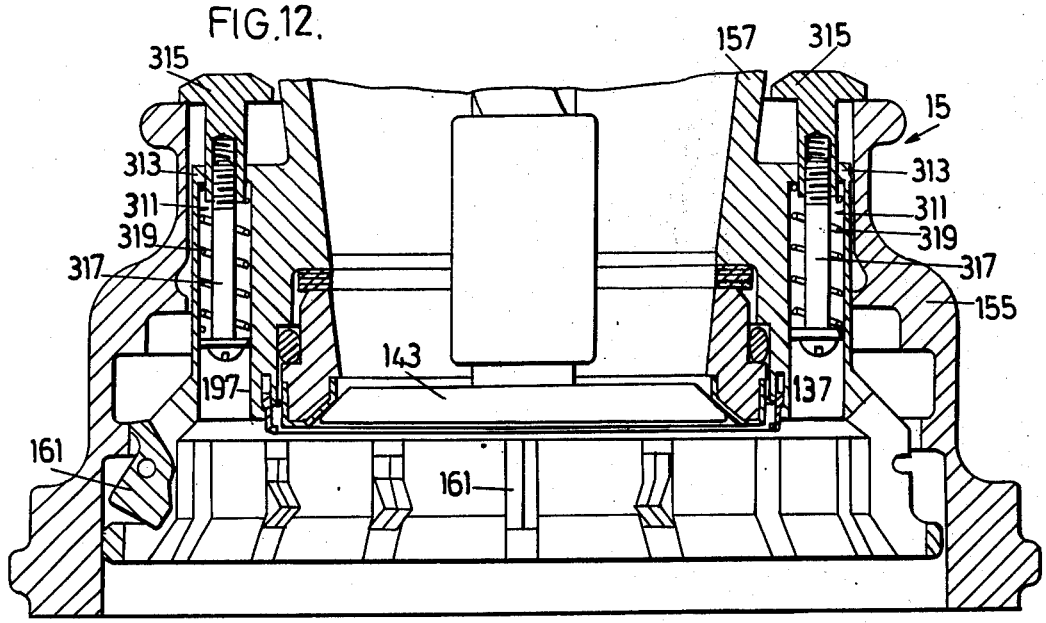
FIG. 12 is a partial schematic view, partially in section, similar to FIG. 11, but rotated 90° about the vertical axis from the view of FIG. 11, showing the improved spring-biased coupling mechanism.

FIGS. 11 and 12 show an alternate and improved embodiment of the coupler 15 which is particularly adaptable for connecting the pressure control valve 11, or any other fluid conduit, to a hydrant 17 when the hydrant 17 is arranged in an orientation other than that shown in FIGS. 1, 2 and 3, that is, when the hydrant valve flange 165 of FIG. 4 is not directed vertically upward. As is explained previously in reference to FIGS. 3 and 4, when the hydrant 17 is arranged in the orientation shown in FIG. 1 the pressure control valve 11 may be readily lowered onto the hydrant 17 and the collar 155 of the coupler 15 will normally drop due to its own weight toward the hydrant 17, locking the lugs 161 in position once the pin 173 is moved to the position shown in FIG. 4 releasing the locking ring 171. It will be immediately recognized, however, that the pressure control valve 11 or any other large fluid conduit which may be attached to the coupler 15 may be quite heavy. If the hydrant 17 is arranged in any orientation other than that shown in FIG. 1, the operator, after placing the coupler 15 adjacent the hydrant 17, will be required to displace the collar 155 toward the hydrant 17 in order to lock the lugs 161 around the hydrant flange 165. This is an exceedingly difficult operation for one operator to accomplish, since he must support the weight of the pressure control valve 11 or other fluid conduit during the depression of the collar 155. In order to alleviate this difficulty the improved coupler 15 of FIGS. 11 and 12 may be utilized.

Like numerals are used in FIGS. 11 and 12 to identify those elements of this improved coupler 15 which are identical to the elements of FIGS. 1 through 10. In this embodiment the locking ring 71 is designed to engage an annular groove 309, the upper edge of which forms a smooth transition to the interior bore of the collar 155 in order to facilitate displacement of the locking ring 177 into the reduced diameter camming portion 175 of the pin 173 when the collar 155 is displaced toward the hydrant 17.

Referring particularly to FIG. 12, the enlarged diameter portion 157 of the coupler 15 includes a pair of bores 311 exterior of the secondary sealing ring 187. Each of the bores 311 terminates in a reduced annular flange portion 313 which serves as a bearing for axial movement of a pin member 315 having an enlarged head which bears on the upper extremity of the collar 155. Each of the pins 315 threadably engages a screw 317. A pair of springs 319 is biased between the head of the screws 317 and the reduced diameter flange 313 so that the pins 315 are biased to move axially within the bearing flanges 313 toward the hydrant 17 to which the coupler 15 is to be attached. It will thus be recognized that the pins 315 bias the collar 155 downward, as viewed in FIGS. 11 and 12, so that when the pin 173 engages the hydrant valve flange 165 (FIG. 4), releasing the locking ring 171, the collar 155 will be displaced due to the bias of the springs 319 toward the hydrant 17 to which the coupler 15 is to be attached.

It will be appreciated, therefore, that the improved coupler 15 shown in FIGS. 11 and 12 facilitates easy attachment of a pressure control valve 11 or other fluid conduit to a hydrant 17 regardless of the orientation of the hydrant 17. For example, if the hydrant 17 is positioned so that its flange 165 faces vertically downward, the operator need only raise and invert the coupler 15 and engage the coupler 15 against the flange 165 of the coupler 17 to depress the pin 173 and the collar 155 will then automatically move to engage the lugs 161 onto the hydrant valve flange 165. When the coupler 15 is to be removed from the hydrant 17, the operator need only pull the collar 155 away from the hydrant 17, releasing the lugs 161 and permitting the pin 173 to move to a position wherein the locking ring 171 engages the groove 309 of the collar 155 to lock the collar 155 in its retracted position against the bias of the springs 319.

What is claimed is:

1. A pressure control valve for use in conjunction with a hydrant for controlling the downstream pressure of a fluid flowing from said hydrant, said hydrant having a poppet valve closing the outlet of the hydrant, comprising:

a main valve housing, including a main flow passage having an inlet and an outlet;

coupler means for coupling said inlet to the outlet of said hydrant;

poppet valve means in said housing for closing said inlet, said poppet valve means being mounted to reciprocate away from said housing to open said inlet and shift said hydrant poppet valve to open the outlet of said hydrant;

means on said housing for reciprocating said poppet valve means away from said housing;

means for sealing said poppet valve means to said inlet when said poppet valve means closes said inlet;

a main piston in said housing, means for adjustably positioning said main piston within said main flow passage to automatically precisely regulate the flow of fluid therethrough, said piston being positionable to close said main flow passage; and means on said housing for bypassing fluid around said main piston when said poppet valve means is positioned to close said inlet, to avoid a fluid lock between said means for sealing said poppet valve means and said main piston and thereby allow said reciprocating means to engage said poppet valve means with said inlet.

2. A pressure control valve as defined in claim 1 wherein said sealing means additionally seals said inlet to said hydrant.

3. A pressure control valve as defined in claim 1 wherein said bypassing means comprises:

a bypass valve mounted within said main valve housing, said valve including a valve stem which contacts said poppet valve means to open said bypass valve when said poppet valve means is positioned to close said inlet.

4. A pressure control valve as defined in claim 3 wherein said bypass valve fluidly connects said inlet to said outlet when said poppet valve means is positioned to close said inlet.

* * * * *